(No Model.)
J. J. KEMPE & F. J. HEINOLD.
TREE PLANTER.
No. 353,070. Patented Nov. 23, 1886.
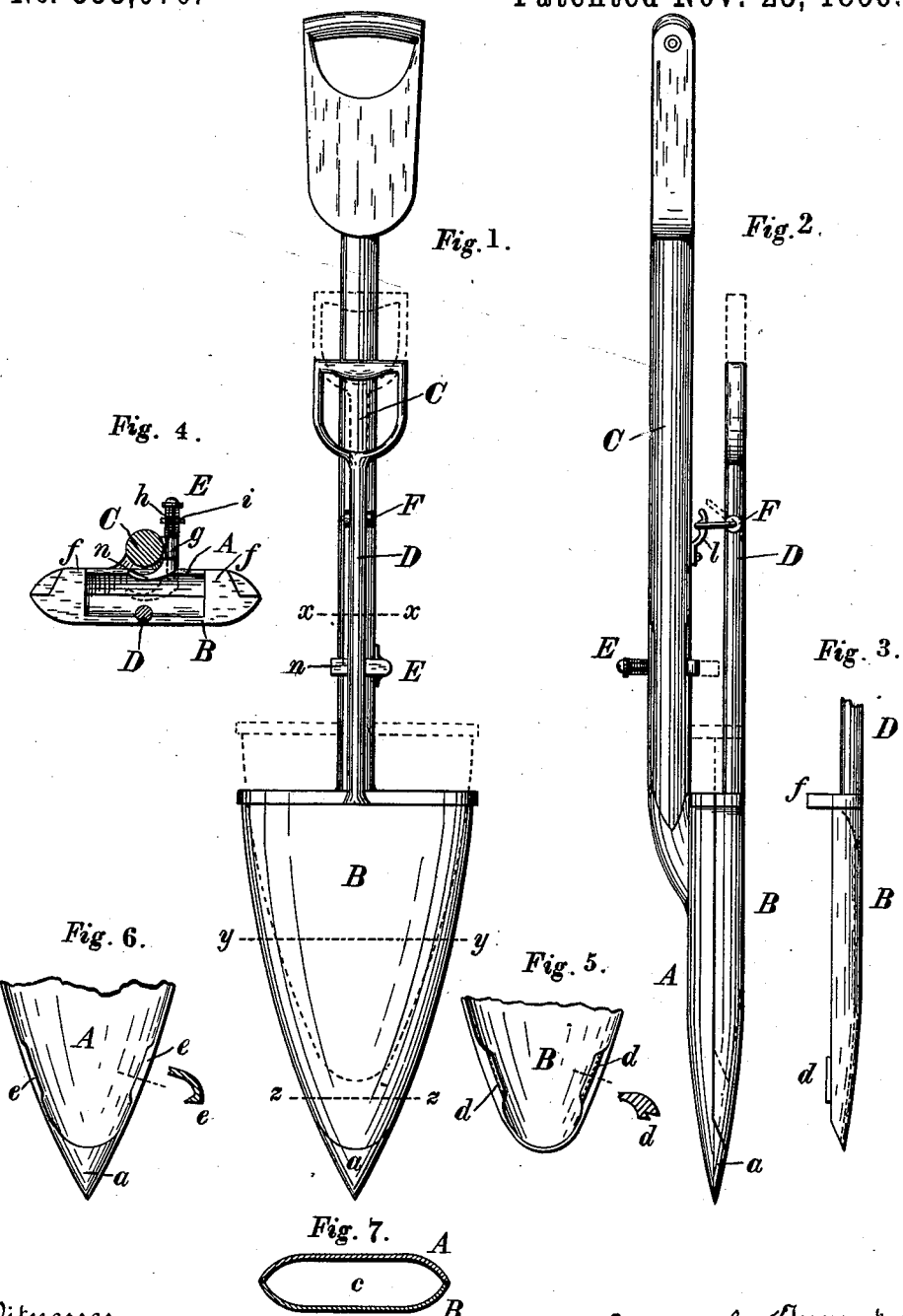

UNITED STATES PATENT OFFICE.

JULIUS J. KEMPE AND FREDRICK J. HEINOLD, OF ROCHESTER, NEW YORK.

TREE-PLANTER.

SPECIFICATION forming part of Letters Patent No. 353,070, dated November 23, 1886.

Application filed July 10, 1886. Serial No. 207,677. (No model.)

*To all whom it may concern:*

Be it known that we, JULIUS J. KEMPE and FREDRICK J. HEINOLD, citizens of the United States, residing at Rochester, in the county of Monroe and State of New York, have jointly invented an Improved Tree-Planter, of which the following is a specification, reference being had to the accompanying drawings.

Our invention relates to an improved instrument for planting nursery stock, or young trees or shrubs, which instrument is fully described and illustrated in the following specification and accompanying drawings, and the novel features thereof specified in the claims annexed to the said specification.

Our improved tree-planter is represented in the accompanying drawings, in which Figure 1 is an elevation. Fig. 2 is a side view. Fig. 3 represents a side view of the guard-blade detached. Fig. 4 is a section on the line $x\ x$, Fig. 1, showing the parts below that line in plan. Fig. 5 represents the interior of the guard-blade. Fig. 6 represents the interior of the main blade. Fig. 7 is a section on the line $y\ y$, Fig. 1. Fig. 8 is a section on the line $z\ z$, Fig. 1.

In the accompanying drawings representing our improved tree-planter, A represents the main blade, which is provided with the handle C; and B, the guard-blade, to which a short handle or device for removing it from the earth should be attached. The blades are formed with their edges curved inward toward each other, so as to come in contact, to exclude the earth when the instrument is inserted therein, and to form a recess between the blades to receive the root or lower portion of the stock. The blades are made of a suitable pointed form, as represented in Fig. 1, adapted to enter the earth easily and to form an opening therein of sufficient dimensions to receive the root.

As indicated in the drawings, the lower end of the guard-blade is beveled or shortened, while the extremity of the main blade A is thickened or made heavier, thereby forming a solid point, $a$, which enters the ground first. The line of division between the blades turns outward above the point $a$, as shown in the side view, Fig. 2. The form of the blades in their transverse section is shown in Figs. 7 and 8, from which it will be seen that a recess, $c$, is formed between them for the reception of the stock.

E represents a clamp, by which the stem or body of the plant is held in place during the planting operation, and F is a suitable hook or catch, by which the handles or upper parts of the two blades are secured together.

Any suitable means for holding the incurved edges of the blades in contact may be employed; but we have found in practice that the beveled lugs $d\ e$, Figs. 5, 6, and 8, answer this purpose satisfactorily at the lower ends of the blades, and the guides $f$ at the upper ends. Near its lower end the guard-blade is provided on each side with the projecting lugs $d$, arranged at angles with the length of the blade, and having their outward edges beveled inward or inclined, so as to form projections which engage with the inner edges of the lugs $e$ on the main blade. When the blades occupy the positions shown in Figs. 1 and 2, the lugs $d$ engage with the lugs $e$ and hold the blades together; but when it is desired to separate the blades the guard-blade B is moved upward slightly, as indicated by the dotted lines in the figures, thereby causing the lugs $d$ to slide free from engagement with the lugs $e$, and permitting the removal of the guard-blade from the main blade. At its upper end the guard-blade is provided with the projecting guides $f$, which enter suitable recesses in the upper part of the main blade, when the two are connected together, and serve to hold the guard-blade in position and prevent lateral movement.

As shown in Fig. 4 the upper end of the recess between the blades is entirely free and unobstructed, so as to permit the introduction of the stock.

The blades may be made of either forged or cast metal, and the handles may be attached thereto in any suitable manner.

The clamp E may be arranged in any suitable manner, so as to hold the stem of the plant in place. As indicated in the drawings, it consists of a socket, $g$, Fig. 4, attached to the handle of the main blade, and having a rod, $h$, carrying an arm, $n$, arranged to slide through it. The stem of the plant is clamped between the side of the arm $n$ and the handle C. Provision is made for fastening the clamp open or away from the handle by means of a suitable spring-catch, which engages with a notch in the rod $h$, or a pin inserted in the rod slides upward and downward in a slot in the socket, the clamp being held open by turning the rod on its axis so as to cause the pin to bear against the end of the socket. A hook or catch, F, on one of the handles engages with the eye or projecting lug $l$ on the other, and serves to hold the handles together.

The guard-blade B is formed in one piece, with the handle or device attached thereto for removing it from the earth. The handle C may be connected with the main blade in any ordinary or preferred manner.

In the operation of our improved planter the digging of trenches or ditches as ordinarily practiced is entirely dispensed with, and the tree or shrub is planted by forcing the instrument into the ground, removing the guard-blade, allowing the earth to fall in around the root, and then withdrawing the main blade. The tree may be held in position between the blades by the clamp E, or it may be inserted in the recess between the blades after they have been forced into the ground. The opening made by the instrument is filled in and the earth tamped around the root by the operator or an assistant, thus completing the planting operation.

We claim —

1. The combination, in a tree-planter, of the detachable recessed blades A and B, provided with handles C and D, a suitable hook, F, for detachably securing the handles together, and means for detachably connecting the blades to each other at or near their points, substantially as described.

2. The combination, with the main blade A and guard-blade B, having incurved and opposing edges, of the lugs $d$ and $e$, substantially as described.

3. The combination, with the main blade A and guard-blade B, having incurved and opposing edges, of the lugs $d$ and $e$ and the guides $f$, substantially as described.

4. The combination, with the main blade A and guard-blade B, having incurved and opposing edges, of the lugs $d$ and $e$, handles C and D, and a suitable hook, F, for securing the handles together, substantially as described.

5. The combination, with the main blade A and the guard-blade B, having incurved and opposing edges, of the handles C and D and clamp E, substantially as described.

6. The combination, with the main blade A and the guard-blade B, having incurved and opposing edges, of the handles C and D, hook F, and clamp E, substantially as described.

7. The combination, in a tree-planter, of the detachable recessed blades A and B, provided with handles C and D, a suitable hook, F, for detachably securing the handles together, and suitable lugs or hooks attached to the blades and arranged to permit the entire separation of the blades from each other, substantially as described.

8. The combination, with the main blade A, having solid point $a$, of the guard-blade B, removably secured to said main blade, substantially as described.

JULIUS J. KEMPE.
FREDRICK J. HEINOLD.

Witnesses:
GEO. B. SELDEN,
H. G. PHILLIPS.